United States Patent [19]

Kole et al.

[11] Patent Number: 4,725,477

[45] Date of Patent: Feb. 16, 1988

[54] PREDECORATED GYPSUM BOARD

[75] Inventors: Donald R. Kole, Elma; Arthur E. Kennedy, North Tonawanda, both of N.Y.; George J. Bean, Jr., Northampton, Mass.

[73] Assignee: National Gypsum Company, Dallas, Tex.

[21] Appl. No.: 812,516

[22] Filed: Dec. 23, 1985

Related U.S. Application Data

[62] Division of Ser. No. 680,798, Dec. 13, 1984, Pat. No. 4,579,610.

[51] Int. Cl.[4] .................................................. B32B 3/10

[52] U.S. Cl. .................................... 428/195; 428/207; 428/211; 428/341; 428/342; 428/537.5; 428/703

[58] Field of Search ............... 428/211, 195, 207, 211, 428/341, 342, 537.5, 703; 427/258, 265, 288; 156/44; 162/134, 137

[56] References Cited

FOREIGN PATENT DOCUMENTS

| | | | |
|---|---|---|---|
| 2927746 | 7/1980 | Fed. Rep. of Germany | 428/211 |
| 67831 | 6/1975 | Japan | 428/211 |
| 19417 | 2/1978 | Japan | 427/265 |
| 50539 | 4/1979 | Japan | 427/265 |
| 89875 | 7/1981 | Japan | 427/265 |
| 107328 | 6/1983 | Japan | 428/211 |

*Primary Examiner*—Henry F. Epstein
*Assistant Examiner*—P. R. Schwartz
*Attorney, Agent, or Firm*—Robert F. Hause

[57] ABSTRACT

A predecorated gypsum wallboard and the method of manufacture wherein a protective base coat is applied on the face paper by a rotogravure printing of the protective coat with minute openings very closely spaced throughout the coating, as by printing the coat in the form of reasonably uniformly sized tiny dots with about 1000 to about 100,000 dots per square inch, a decorative coat is applied over the base coat, gypsum wallboard is formed with the coated surface of the paper on the outside face, and the newly formed wallboard, when hardened, is dried by heating and removing water from the gypsum core through the still porous coated paper.

16 Claims, No Drawings

PREDECORATED GYPSUM BOARD

CROSS REFERENCE TO RELATED APPLICATION

This application is a division of copending application, Ser. No. 06/680,798, filed Dec. 13, 1984, now U.S. Pat. No. 4,579,610.

This invention relates to predecorated gypsum wallboard face paper, to gypsum wallboard made therefrom and to the method of making the face paper and the gypsum wallboard.

BACKGROUND OF THE INVENTION

Gypsum wallboard is commonly used, in any of several different forms, in constructing interior walls and ceilings. In its most common form, a cream-colored face paper forms the wall exterior, the joints are covered by a setting or drying cementitious material, and the resultant monolithic wall is painted. The cream color of the face paper is provided by the choice of fibers used in the surface ply in its manufacture and/or dyes incorporated therein.

Other forms of gypsum board have been developed and marketed, with the alm of reducing the labor required in constructing, finishing and decorating the wall. These other forms generally involved substantial increases in the product cost, and met with little success unless they also incorporated a relatively maintenance-free surface, providing the justification for the substantial increase. In such cases, the increase in cost has generally been such that it was hard for consumers to justify except in large commercial structures, where subsequent maintenance costs are of substantial importance.

One problem that is faced in any attempt to provide a predecorated web of paper to be used in the subsequent manufacture of a paper-covered, gypsum-core wallboard is the necessity of providing a durable surface while maintaining sufficient porosity through the predecorated paper so that, after the gypsum and paper have been combined, the newly formed boards can be dried by high temperature removal of the excess water in the core through the predecorated face paper. Prior attempts to provide predecorated face papers for use in making gypsum board generally involved a coating which decreased porosity excessively. One prior solution to this problem, described in Veschuroff U.S. Pat. No. 3,694,298, suggests embossing the paper after it is coated, possibly using several embossing steps, until the porosity desired is achieved.

A lower cost, predecorated, substantially maintenance-free gypsum wallboard, which can justify its increased cost, relative to regular cream-faced gypsum wallboard, in home construction, particularly prefabs, is always being sought.

SUMMARY OF THE INVENTION

The present invention consists of a predecorated gypsum board paper suitable for use in making gypsum board on standard manufacturing equipment, and a wallboard made therewith having the essential maintenance-free characteristics.

In accordance with the invention, a white-faced or cream-faced gypsum board paper is first rotogravure printed, throughout its front surface, with a base coat of clear or tinted thermosetting, catalyzed, or self-cross-linking aqueous latex, having substantially through-out minutely closely spaced, minute openings or voids, which open areas may be continuous with discontinuous minute areas of base coat, or discontinuous minute areas surrounded by continuous or adjoined areas of base coat, or a combination of the two, which, following relatively instantaneous drying, is overprinted with a high binder, thermoplastic resin containing ink, which may be applied throughout any percentage desired of the total area, preferably in from 2 to 8 separate printing steps with, thus, 2 to 8 different colors or tints produced in the top decorative coating. The base coat is subsequently cured.

It is an object of the present invention to provide a novel predecorated paper for the manufacture of gypsum wallboard and a novel predecorated wallboard made therefrom.

It is a further object to provide a novel process for making a predecorated gypsum wallboard paper and, thus, a novel process for making predecorated gypsum wallboard.

It is a still further object to provide a process and resultant predecorated gypsum wallboard at a relatively low cost, having a high degree of maintenance-free characteristics.

DESCRIPTION OF THE PREFERRED EMBODIMENTS

These and other objects and advantages of the invention will be more readily apparent when considered in relation to the preferred embodiments of the invention as set forth in the following specification.

In accordance with the invention, gypsum wallboard paper, of about 0.005 to 0.020 inch thickness, is first manufactured using known Fourdrinier or cylinder type paper machines. The quality of the predecorated gypsum board made by the invention will be, in part, dependent on the smoothness of the front surface of the face paper, with a smoothness of from about 60 to about 400 Sheffield units being satisfactory for most designs, and about 60 to about 200 Sheffield units being essential for high fidelity designs, such as wood grain patterns. The lower the Sheffield units for any paper, and thus the smoother the paper, the better it will be for use in the invention.

The porosity of the paper to be predecorated preferably has a porosity of about 25 to 70 seconds, when tested using a Gurley Densometer, in accordance with TAPPI Standards T460m-49, however less porous paper, up to 100 seconds or more, can still be used to make predecorated front paper in accordance with the invention. More porous paper, as fast as about 10 seconds, can also be successfully used. Considering porosity alone, the more porous the paper is the better for making gypsum board.

The Cobb value of the paper, tested on the front surface, in accordance with the general test outlined by TAPPI, should be no greater than 1.8 grams. The consistent brightness and color of the paper can be of importance in maintaining a consistent product, with each predecorated board of a given design matching all other boards of the same given design.

The front surface of the face paper is, first, printed, by the rotogravure process, with a plurality of closely spaced minute dots or extremely narrow, closely spaced parallel lines, when viewed through a microscope, forming a coat of a thermosetting aqueous latex emulsion having substantially throughout minutely closely spaced, minute openings or voids, which open areas may be continuous with discontinuous minute areas of base coat, or discontinuous minute areas surrounded by continuous or adjoined areas of base coat, or a combination of the two. This thermosetting aqueous latex emulsion coat may be either clear or tinted. It is preferably disposed uniformly throughout substantially all of the face paper front surface. This coat of separated minute dots or lines or the like of thermosetting aqueous latex emulsion, immediately after application, normally flows to a limited extent prior to its drying, forming a base coat, which when dried may be in the form of minute separated dots or lines or in the form of minute interconnected dots with a great plurality of openings resulting from the emulsion of the dots or lines being insufficient to completely coat and close any substantial area. These openings are spaced apart at average distances of between 0.1 inch and 0.001 inch, and preferably about 1/32 inch to about 1/320 inch, relatively uniformly throughout the base coat.

The viscosity of the thermosetting aqueous latex emulsion is important in order to be able to deposit a proper amount by a rotogravure process onto the face paper front surface. Viscosity determination, by a General Electric Zahn viscometer method, should indicate a viscosity of about 15 to about 30 seconds, when measuring the time for a measured amount of emulsion, contained in a #2 Zahn cup, to flow out through the orifice in the bottom, a test method commonly used in the ink and paint industry. Plain water, tested in a #2 Zahn cup, has a viscosity of about 15 seconds, and, thus, about 15 seconds is the minimum viscosity of a suitable thermosetting aqueous latex emulsion. The maximum permissible viscosity is that viscosity at which the emulsion can still be deposited by a rotogravure process.

Preferably the base coat is a self-reactive, cross-linking copolymer, activated by heat after having a second design coat printed over the base coat. This heat activation, to cure the base coat, can be delayed until after the paper has been used to form gypsum wallboard, at which time curing is carried out in the wallboard dryer, as the wallboard is dried, and excess water in the set gypsum core is removed. The curing forms a tough, hard, durable, non-blocking coating, from a coating which had no durability before curing.

The thermosetting latex base coat may be a self-reactive acrylic, or an acrylic-vinyl copolymer. Examples of suitable thermosetting acrylic latex emulsions include Amsco RES 3112 sold by Union Chemicals Division of Union Oil Company of California as number 8262, and a Clear Gloss Aqualure sold by Glidden Coatings and Resins Division of SCM Corporation as number 847-C-02109. Prior to use, the Clear Gloss Aqualure must be catalyzed in the ratio of one part by weight of Catalyst Converter 297-C-12128 to thirteen parts by weight of Clear Gloss Aqualure.

The base coat is applied at a rate of about one to three pounds of 30% solids emulsion per thousand square feet of paper, or about $\frac{1}{4}$ to one pound of solids per thousand square feet of paper. This emulsion is applied to a continuously moving web, about four feet wide, of face paper, by the rotogravure process, using a chromed steel roll rotary press, printing the emulsion in the form of minute shapes minutely spaced apart substantially throughout the whole front surface of the face paper, with the exception of an uncoated edge portion at each side, of about $\frac{5}{8}$" to $\frac{3}{4}$" width.

If minute dots are employed, they are of a size such that there are between about 1000 and 100,000 spaced apart dots per square inch, preferably from about 3000 to 40,000 spaced apart dots per square inch, such as about 55 to 200 dots per lineal inch in each of two perpendicular directions, for example. The dots are formed by the emulsion being placed in minute holes extending into the rotogravure printing roll and deposited on the paper surface in a manner similar to rotogravure printing of ink solutions. The holes, and the resultant dots may be of any shape, circular, square, oblong, etc., so long as the holes will retain the emulsion until the paper is contacted and the emulsion will then deposit on the paper, at the desire rate of application. Typically the holes may average about 0.005 inch in diameter and between about 0.001 and 0.002 inch deep. If a pattern of narrow lines are employed, there should be about 30 to about 300 lines per inch.

As an example, the rotary press cylinder may have holes or depressions of a generally semi-spherical shape, arranged in diagonal rows, 45° in each direction from a line circumscribing the circumference of the cylinder, with 120 holes per inch in each diagonal direction, and thus 14,400 holes or depressions per square inch. The holes or depressions are separated by lands between depressions which extend in a generally zig-zag manner circumferentially around the cylinder, resulting from the diagonal arrangement of the rows of depressions, and from the narrow shallow groove adjoining depressions lying adjacent to each other in circumferential directions. This gravure print cylinder is referred to as having a QCH cell configuration in the rotogravure printing industry and is a preferred cell configuration in the present invention.

The base coat is dried, but not cured, immediately and the base-coated paper is fed to a plurality of, from about 2 to about 8, printing rolls, each of which prints a design onto the base-coated, but not cured, paper using what are referred to as high-binder durable inks. The base coat, once cured, protects the paper, and the durability of the inks protects the inks.

Each printing roll applies a portion of a design, each in different colors or different shades of a color, preferably in small blotches, i.e. small, irregular spots or marks using the high-binder inks. The high-binder inks are a mixture of pigment, a thermoplastic resin, and a solvent, all of which preferably are relatively non-reactive with the base coat.

The base-coated and printed front paper is then either fed directly to a machine for forming gypsum wallboard, or wound into a roll temporarily, to subsequently be unwound and fed to a wallboard machine. When fed to the wallboard machine, the face paper is conveyed, front surface down, and a settable gypsum aqueous slurry is disposed on the face paper back surface. A continuous web of back paper is then disposed over the gypsum slurry and the edges of the face paper are wrapped up and around the edge of the slurry, as the composite is formed into a flat thin board form.

The back paper may be of any known sultable type of gypsum board paper, preferably generally similar to the basic uncoated face paper, particularly in weight and porosity, but of lower cost paper fiber raw material, less brightness and less smoothness, these characteristics being of less importance on the gypsum board back surface.

After forming, the gypsum boards of the invention are cut into suitable lengths and conveyed through a high temperature board dryer. The base coat is cured in the board dryer, forming the very durable coating essential in predecorated wallboards. A period of about 5 minutes at 300° F. or a period of about 30 minutes at 200° F. are typical of the amount of heat required for a satisfactory cure of a preferred thermosetting base coat.

Having completed a detailed disclosure of the preferred embodiments of our invention so that those skilled in the art may practice the same, we contemplate that variations may be made without departing from the essence of the invention or the scope of the appended claims.

We claim:

1. A predecorated gypsum wallboard face paper suitable for use in manufacturing gypsum wallboard, said paper comprising a continuous web of porous paper of about 0.005 to 0.020 inch thickness, said paper having a base coat of uncured reactive and curable resin applied to the front surface in a pattern of a plurality of small printed shapes spaced closely apart throughout said surface, and a colored design of high-binder inks printed over said base coat throughout any percentage desired of the total area of said paper front surface, said high-binder ink designs comprising blotches of a pigment and thermoplastic resin mixture.

2. A predecorated gypsum wallboard face paper as defined in claim 1 wherein said plurality of small printed shapes form openings through said base coat spaced apart at average distances of between about 0.1 inch and about 0.001 inch.

3. A predecorated gypsum wallboard face paper as defined in claim 1 wherein said plurality of small printed shapes form openings through said base coat spaced apart at average distances of between about 1/32 inch and about 1/320 inch.

4. A predecorated gypsum wallboard face paper as defined in claim 1 wherein said base coat is present in an amount of about ¼ to about one pound of material per thousand square feet of paper.

5. A predecorated gypsum wallboard face paper as defined in claim 1 wherein said base coat is a clear acrylic.

6. A predecorated gypsum wallboard face paper as defined in claim 1 wherein said printed shapes are small dots with about 1,000 to about 100,000 dots per square inch.

7. A redecorated gypsum wallboard face paper as defined in claim 1 wherein said printed shapes are narrow parallel lines, with about 30 to about 300 lines per lineal inch.

8. A predecorated gypsum wallboard face paper as defined in claim 1 wherein said colored design printed over said base coat is printed in a plurality of colors and consists of a plurality of small blotches of each respective color.

9. A predecorated gypsum wallboard, comprising a set gypsum core, a back paper and a predecorated face paper, said face paper having been formed by the method comprising the steps of applying a base coat of reactive, curable resin to the front surface of a gypsum wallboard porous face paper by a rotogravure printing process, said base coat being printed on said surface in a pattern consisting of small printed shapes spaced closely apart throughout said surface and printing a colored design over said base coat throughout any percentage desired of total area of said paper front surface with high-binder inks, said high-binder inks comprising a mixture of pigment, thermoplastic resin and a solvent, all non-reactive with said base coat, said uncured reactive and curable resin having been set by the prior application of heat thereto.

10. A predecorated gypsum wallboard as defined in claim 9 wherein said plurality of small printed shapes form openings through said base coat spaced apart at average distances of between about 0.1 inch and about 0.001 inch.

11. A predecorated gypsum wallboard as defined in claim 9 wherein said plurality of small printed shapes form openings through said base coat spaced apart at average distances of between about 1/32 inch and about 1/320 inch.

12. A predecorated gypsum wallboard as defined in claim 9 wherein said base coat is present in an amount of about ¼ to about one pound of material per thousand square feet of paper.

13. A predecorated gypsum wallboard as defined in claim 9 wherein said base coat is a clear acrylic.

14. A predecorated gypsum wallboard as defined in claim 9 wherein said printed shapes are small dots with about 1,000 to about 100,000 dots per square inch.

15. A predecorated gypsum wallboard as defined in claim 9 wherein said printed shapes are narrow parallel lines, with about 30 to about 300 lines per lineal inch.

16. A predecorated gypsum wallboard as defined in claim 9 wherein said colored designed printed over said base coat is printed in a plurality of colors and consists of a plurality of small blotches of each respective color.

* * * * *